US006447833B1

(12) United States Patent
Widlak

(10) Patent No.: US 6,447,833 B1
(45) Date of Patent: Sep. 10, 2002

(54) PEANUT BUTTER STABILIZER AND METHOD FOR MANUFACTURING STABILIZED PEANUT BUTTER

(75) Inventor: Neil Widlak, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 09/659,544

(22) Filed: Sep. 11, 2000

Related U.S. Application Data

(60) Provisional application No. 60/152,923, filed on Sep. 9, 1999.

(51) Int. Cl.$^7$ .............................. A23L 1/36; A23D 9/007
(52) U.S. Cl. ....................... 426/633; 426/520; 426/607; 426/654
(58) Field of Search ................................. 426/633, 607, 426/654, 520

(56) References Cited

U.S. PATENT DOCUMENTS

| | | | |
|---|---|---|---|
| 3,127,272 A | 3/1964 | Baker et al. | 99/128 |
| 3,129,102 A | 4/1964 | Sanders | 99/128 |
| 3,265,507 A | 8/1966 | Japikse | 99/128 |
| 3,671,267 A | 6/1972 | Gooding et al. | 99/128 |
| 3,766,226 A | 10/1973 | Gooding et al. | 260/398.5 |
| 4,260,643 A | 4/1981 | Cochran | 426/606 |
| 4,288,378 A | 9/1981 | Japikse et al. | 260/409 |
| 4,341,814 A | 7/1982 | McCoy | 426/607 |
| 4,889,740 A | 12/1989 | Price | 426/606 |
| 4,996,074 A | 2/1991 | Seiden et al. | 426/601 |
| 5,470,598 A | 11/1995 | Scavone | 426/607 |
| 6,117,476 A * | 9/2000 | Eger et al. | 426/607 |

FOREIGN PATENT DOCUMENTS

| | | |
|---|---|---|
| WO | 95/00033 | 1/1995 |

OTHER PUBLICATIONS

Hinds, M.J., et al., "Unhydrogenated Palm Oil as a Stabilizer for Peanut Butter," *J. Food Sci.* 59:816–820, 832, The Institute of Food Technologists (1994).

Weiss, T.J., in *Food Oils and Their Uses*, The AVI Publishing Company, Westport CT, pp. 14–17, and 179–180 (1970).

Duxbury, D.D., "Peanut butter stabilizer prevents oil separation," *Food Processing* 47:120, Putnam Publishing Company (1986).

Duxbury, D.D., "Peanut butter stabilizer multi–functional," *Food Processing* 51:100, Putnam Publishing Company (1990).

"Gillco ingredients (Myverol) and Gillco Distilled Monoglycerides (Myverol)," [retrieved from the internet: <url:url:http://www.gillco.com/Pages/Myverol.html and <url:http://www.gillco.com/html/distilled$_{14}$ monoglycerides.html>], [retrieved on: Dec. 4, 2000].

* cited by examiner

*Primary Examiner*—Helen Pratt
(74) *Attorney, Agent, or Firm*—Sterne, Kessler, Goldstein & Fox, PLLC

(57) ABSTRACT

A novel peanut butter stabilizer, suitable for preventing the separation of oils from peanut butter during storage, is disclosed. The peanut butter stabilizer contains: (a) a substantially completely hydrogenated edible oil fraction having an Iodine Value of less than 10, and (b) a concentrated monoglyceride fraction having an Iodine Value between 15 and 70, wherein the weight ratio of the hydrogenated edible oil fraction (a) to the concentrated monoglyceride fraction (b) is between 9:1 and 1:9. In a preferred embodiment, the peanut butter stabilizer contains (a) substantially completely hydrogenated cottonseed oil having an Iodine Value less than 8, and (b) partially hydrogenated soybean distilled monoglyceride having an Iodine Value between 20 and 60, wherein the weight ratio of the substantially hydrogenated cottonseed oil (a) and the partially hydrogenated soybean distilled monoglyceride (b) is about 3:1. Peanut butter incorporating this peanut butter stabilizer, methods for manufacturing the stabilized peanut butter, and foods incorporating the stabilized peanut butter are also disclosed.

57 Claims, No Drawings

PEANUT BUTTER STABILIZER AND METHOD FOR MANUFACTURING STABILIZED PEANUT BUTTER

This application claims the benefit of U.S. Appl. Ser. No. 60/152,923, filed Sep. 9, 1999.

BACKGROUND OF THE INVENTION

1. Field of the Invention

This invention relates to a novel peanut butter stabilizer suitable for preventing the separation of oils from peanut butter during storage. This invention also relates to peanut butter incorporating the novel peanut butter stabilizer, to methods for the manufacture of this peanut butter, and to foods incorporating this peanut butter.

2. Related Art

Conventional peanut butter consists of a mixture of ground roasted peanuts, liquid oil, and usually one or more sweetening agents and salt. Emulsifiers may also be added to reduce stickiness so that during consumption the peanut butter does not stick to the roof of the mouth. The process of manufacturing peanut butter is well known in the art. See, e.g., Weiss, T. J., "*Food Oils and Their Uses*," The AVI Publishing Company, Westport Conn., pp. 177–193 (1970), Woodroof, J. G., "*Peanuts: Production, Processing, Products, Second Edition,*" The AVI Publishing Company, Westport, Conn., pp. 153–193 (1973) and U.S. Pat. Nos. 3,127,272; 3,129,102; 3,265,507; 3,671,267; 3,882,254; and 5,230,919.

During the storage of peanut butter a layer of liquid oil tends to form on the top of the product. This tendency of peanut butter to separate on standing can be overcome to some extent by the addition of stabilizers. Stabilizers also aid in maintaining the physical integrity of the product during shipment and storage, particularly if temperatures vary significantly. Stabilizers generally comprise high melting point fats and oils such as partially hydrogenated fat, completely hydrogenated fat, monoglyceride and diglyceride esters of saturated fatty acids, or mixtures thereof. Stabilizers typically constitute between 0.5 and 5.5% of the peanut butter; most typically, about 2%.

Stabilizers may be added with other dry ingredients to the peanuts prior to grinding. During the grinding process there is sufficient heat generated to melt and disperse the stabilizer into the oil phase of the peanut butter. Alternatively stabilizers may be added to the hot peanut butter prior to dispensing the product into containers. Upon cooling the stabilizer forms a crystalline network that entraps free oil, preventing the oil from separating from the ground peanut particles.

The crystallized fats of the stabilizer are polymorphic and thus capable of existing in different crystal forms with varying degrees of stability. The major crystal forms of interest in food processing are alpha, beta-prime, and beta. Stabilizers that remain stable in the fine grained, beta-prime crystalline form are generally preferred. These stabilizers promote the formation of a product that has a smooth surface, has a smooth texture, and is stable under varying storage conditions. See, Weiss, T. J., "*Food Oils and Their Uses*," The AVI Publishing Company, Westport Conn., pp. 14–17, 179–180 (1970).

In order to obtain the desired stability at the relatively high temperatures sometimes encountered during transportation and storage, stabilizers generally have high melting points, typically 110–150° F. When these high melting materials are added to the peanut butter in a quantity large enough to stabilize the oil, the peanut butter becomes excessively firm at the ordinary temperatures of use. As a result, the product may be difficult to spread; and it may have a waxy taste and melt slowly in the mouth. Numerous attempts have previously been made to develop a peanut butter stabilizer that effectively prevents oil separation without undesirably affecting the spreadability or taste of the peanut butter in which it is incorporated.

U.S. Pat. No. 3,127,272 (Baker, et al.) discloses a method for making a peanut spread wherein the peanut spread contains about 0.3% to 3.5% stabilizer, by weight; and the stabilizer comprises from 0% to about 20% of a partially hydrogenated fatty glyceride having a Solid Contents Index (SCI) value at 50° F. of from about 17 to 28 and an SCI value at 92° F. of not more than about 6.

U.S. Pat. No. 3,129,102 (Sanders) discloses a stabilized peanut butter containing from about 0.5% to 5%, by weight, hydrogenated rapeseed oil, with an Iodine Value of not greater than about 10 and optionally up to 1.0%, by weight, hydrogenated cottonseed oil with an Iodine Value not greater than about 10.

U.S. Pat. No. 3,265,507 (Japikse) discloses a stabilized peanut butter containing from about 1% to about 5%, by weight, of substantially completely hydrogenated hardstock, having an Iodine Value not exceeding 12, where the substantially completely hydrogenated hardstock consists essentially of a blend of (a) beta-phase-tending hardstock and (b) non-beta-phase-tending hardstock having a substantial portion of fatty acid groups having about 20 to 24 carbon atoms, in a weight ratio of from about 3:7 to about 7:3. Preferably the beta-phase-tending hardstock is substantially completely hydrogenated soybean oil; and the non-beta-phase-tending hardstock is substantially completely hydrogenated rapeseed oil.

U.S. Pat. Nos. 3,671,267 and 3,766,267 (Gooding, et al.) disclose a stabilized peanut butter comprising from about 0.5% to about 2.3% of a symmetrical monounsaturated-disaturated glyceride, from about 0.35% to about 1.3% of a trisaturated glyceride, and not more than about 2% total of a diunsaturated-monosaturated glyceride and/or unsymmetrical monounsaturated-diunsaturated glyceride, the percentage figures being percent by weight of the peanut butter.

U.S. Pat. Nos. 3,671,267 and 3,766,267 also disclose a peanut butter stabilizer that is a blend comprising a symmetrical monounsaturated-disaturated glyceride, a trisaturated glyceride, and a glyceride selected from the group consisting of a diunsaturated-monosaturated glyceride, an unsymmetrical monosaturated disaturated glyceride, and mixtures thereof in a ratio of 0.5–7 parts symmetrical monounsaturated-disaturated glyceride: 1 part trisaturated glyceride: a maximum of 6 parts unsymmetrical monounsaturated-disaturated glyceride and/or diunsaturated-monosaturated glyceride, the parts figures being parts by weight.

U.S. Pat. No. 4,260,643 (Cochran) discloses a non-fractionated triglyceride composition containing by weight 40–50% saturated fatty acids. 5–20% trisaturated glycerides, 30–40% trans acid, 14–20% cis acid, and exhibiting a Wiley melting point of from 114°–127° F., an Iodine Value of from 43–52, and a solid fat index as follows: 65.2–76.2 at 50° F., 57.2–76.8 at 79° F., 53.0–76.9 at 80° F., 43.9–72.0 at 92° F. and 27.3–54.0 at 104° F. In one embodiment, this non-fractionated triglyceride composition is a peanut butter stabilizer, comprising 77.33% partially hydrogenated cottonseed oil (IV 47.6), 16.67% palm oil flakes, and 6.00% cottonseed oil flakes.

U.S. Pat. No. 4,260,643 also discloses a peanut butter composition stabilized by the presence of from 1–6% by weight of the total composition of the above-described non-fractionated triglyceride composition and, optionally, small amounts of fully saturated triglycerides. In one embodiment, this stabilized peanut butter composition is a whipped peanut butter product comprising 2% by weight of the aforementioned peanut butter stabilizer.

U.S. Pat. No. 4,288,378 (Japikse, et al.) discloses a method of preparing a peanut butter stabilizer comprising the steps of: (a) randomly interesterifying a first mixture of from 0% to 70% hydrogenated peanut oil and from 30% to 100% unhydrogenated peanut oil (a preferred first mixture comprises 30% to 70% hydrogenated and 30% to 100% unhydrogenated peanut oil), (b) fractionally crystallizing from the first mixture a second mixture of triglycerides having at least 10% fatty acids from 20 to 24 carbon atoms; and (c) substantially completely hydrogenating the second mixture to form the peanut butter stabilizer.

U.S. Pat. No. 4,341,814 (McCoy) discloses a peanut butter stabilizer composition comprising (a) an intermediate melting fat fraction having an Iodine Value of from 25 to 45 and (b) a hydrogenated oil component comprising a triglyceride having a high proportion of $C_{20}$–$C_{22}$ fatty acids and, optionally a second hydrogenated oil, where the hydrogenated oil component has an Iodine Value of less than 8.

U.S. Pat. No. 4,996,074 (Seiden, et al.) discloses a tailored beta-prime stable hardstock comprising: (a) from about 40% to about 98% of 2-stearoyldipalmitin (PSP) triglycerides; (b) from about 2% to about 55% of 1-palmitolydistearin (PSS) triglycerides; (c) less than about 7% of tripalmitin (PPP) triglycerides; (d) less than about 25% of tristearin (SSS) triglycerides; (e) less than about 30% of total PPP plus SSS triglycerides; and (g) less than about 10% of the fatty acids of the total triglycerides and diglycerides being unsaturated. This hardstock can be used as a stabilizer in the manufacture of reduced fat nut butters (see, e.g., U.S. Pat. No. 5,230,919 (Walling, et al.)).

D. D. Duxbury, "Peanut butter stabilizer prevents oil separation," *Food Processing*, 47:120 (1986), discloses a peanut butter stabilizer that is a blend of hydrogenated palm oil and distilled monoglyceride of hydrogenated palm oil.

D. D. Duxbury, "Peanut butter stabilizer multifunctional," *Food Processing*, 51:100 (1990) discloses a peanut butter stabilizer that is a blend of fully hydrogenated vegetable oils (a mixture of rapeseed oil and cottonseed oil) and distilled monoglycerides derived from vegetable oils.

M. J. Hinds, et al., "Unhydrogenated Palm Oil as a Stabilizer for Peanut Butter," Journal of Food Science, 59:816–832 (1994) discloses the use of unhydrogenated palm oil as a stabilizer for peanut butter. It also discloses a peanut butter stabilizer that is a fully hydrogenated blend of rapeseed and cottonseed oils containing 33–37% behenic acid ($C_{22:0}$)Due Due to their unique crystalline properties, combinations of fully hydrogenated cottonseed and rapeseed vegetable oils (e.g., U.S. Pat. No. 3,265,507) are commonly used as peanut butter stabilizers. As describe above, a variety of alternative peanut butter stabilizers have also been proposed. However, the stabilizers of the prior art have not entirely achieved the objectives of: (a) preventing free oil development on the surface during shelf life, (b) imparting an appropriately stiff texture to the peanut butter at room temperature while retaining spreadability, and (c) maintaining a pleasing, non-waxy taste for the peanut butter in which it is incorporated.

SUMMARY OF THE INVENTION

It is therefore an object of the present invention to provide an improved peanut butter stabilizer which, when incorporated into peanut butter, will yield a peanut butter exhibiting improved storage stability and reduced oil separation, while maintaining spreadability and a pleasing taste.

It is another object of the present invention to provide an improved peanut butter which exhibits superior storage stability and reduced oil separation, while maintaining spreadability and a pleasing taste.

It is another object of the present invention to provide a method for the manufacture for this improved peanut butter.

It is a further objective of the present invention to provide edible foods incorporating this improved peanut butter.

These and other objects of the invention will be made clear by the disclosure herein.

It has unexpectedly been discovered that a blend of fully hydrogenated edible oil with an Iodine Value (IV) less than 10 and a concentrated monoglyceride with an IV between 15 and 70, can impart equivalent textural properties, at lower concentrations in a peanut butter, than fully hydrogenated vegetable oil stabilizers, fully hydrogenated distilled monoglycerides, or combinations of fully hydrogenated vegetable oils and fully hydrogenated monoglycerides. Unexpectedly, stabilizers comprising a blend of partially hydrogenated distilled monoglycerides with an TV between 22 and 55 and fully hydrogenated cottonseed oil, impart a firmer texture than the blend of fully hydrogenated distilled monoglycerides and fully hydrogenated cottonseed oil.

The present invention consists of a unique stabilizer composition yielding superior texture, stability, and oil retention, when incorporated into peanut butter. This unique stabilizer composition comprises a substantially hydrogenated edible oil and a concentrated monoglyceride in a weight ratio between 9:1 and 1:9.

The invention provides an improved peanut butter stabilizer composition comprising:
(a) a substantially completely hydrogenated edible oil fraction having an IV of less than 10, and
(b) a concentrated monoglyceride fraction having an IV between 15 and 70,
wherein the weight ratio of said hydrogenated edible oil fraction (a) to said concentrated monoglyceride fraction (b) is between 9:1 and 1:9. Preferably this peanut butter stabilizer comprises completely hydrogenated cottonseed oil and partially hydrogenated soybean distilled monoglyceride, preferably in a weight ratio of between 5:1 and 1:1; more preferably, between 4:1 and 1:1; more preferably, between 3:1 and 1:1; most preferably, about 3:1.

The invention also relates to a peanut butter incorporating the improved peanut butter stabilizer, to methods for manufacturing this peanut butter, and to foods incorporating this peanut butter.

DETAILED DESCRIPTION OF THE PREFERRED EMBODIMENTS

In one embodiment, the present invention relates to a peanut butter stabilizer composition comprising:
(a) a substantially completely hydrogenated edible oil fraction having an IV of less than 10, and
(b) a concentrated monoglyceride fraction having an IV between 15 and 70,
wherein the weight ratio of said hydrogenated edible oil fraction (a) to said concentrated monoglyceride fraction (b) is between 9:1 and 1:9.

In a preferred embodiment, the above-described peanut butter stabilizer comprises substantially completely hydrogenated edible oil that is substantially completely hydrogenated vegetable oil (a) and concentrated monoglyceride that is partially hydrogenated distilled monoglyceride (b); preferably the ratio of (a) to (b) is between 5:1 and 1:1; more preferably, between 4:1 and 1:1; more preferably, between 3:1 and 1:1; most preferably, about 3:1. Most preferably, the peanut butter stabilizer comprises substantially completely hydrogenated cottonseed oil (a) and partially hydrogenated soybean distilled monoglyceride (b).

Unless otherwise stated, all percentages herein are expressed as weight percent.

Concentrated monoglyceride, as used throughout, refers to a mixture comprising one or more monoglycerides wherein the total monoglyceride content is at least 80% of the mixture, by weight. A concentrated monoglyceride may be prepared by any suitable process, including but not limited to molecular distillation.

Distilled monoglyceride, as used throughout, has the meaning customary to the food processing industry, provided that the monoglyceride content of the distilled monoglyceride is at least 80% by weight. A distilled monoglyceride is a concentrated monoglyceride within the meaning of this application.

IV, as used throughout, refers to the Iodine Value, which indicates the number of grams of iodine equivalent to the halogen absorbed by a 100 gram sample of an oil or a fat. The Iodine Value may be determined by the Wijs method, see, e.g., the American Oil Chemists' Society (A.O.C.S.), Official Method Tg 1–64 (93). During hydrogenation, the consistency of a fat or oil becomes more solid as unsaturated triglyceride molecules become more saturated by the addition of hydrogen. Thus, in general, the lower the Iodine Value of a given sample, the greater will be its content of solids at a given temperature.

SFI, as used throughout, refers to the Solid Fat Index (formerly known as the SCI or Solid Content Index), which is an empirical measure of the solid fat content of a triglyceride system as calculated from specific volume at given temperatures. See, Fulton, N. D., et al., "A quick dilatometric method for control and study of plastic fat," *J. Am. Oil Chemists' Soc.* 31:98–103 (1954) and the American Oil Chemists' Society (A.O.C.S.) Official Method Cd 10–57 (93).

Wiley melting point, as used throughout, refers to the temperature, under the conditions of the test, at which a sample disc of solid fat assumes a spherical shape. The Wiling melting point is an index of the temperature at which the fat melts. See, e.g., A.O.C.S. Official Method Cc 2–38 (91).

In another embodiment, the present invention relates to a peanut butter stabilizer composition comprising:
(a) a substantially completely hydrogenated edible oil fraction having an IV of less than 8, and
(b) a concentrated monoglyceride fraction having an IV between 20 and 60, wherein the weight ratio of said hydrogenated edible oil fraction (a) to said concentrated monoglyceride fraction (b) is between 5:1 and 1:1.

In a preferred embodiment, the above-described peanut butter stabilizer comprises substantially completely hydrogenated edible oil that is substantially completely hydrogenated vegetable oil (a) and concentrated monoglyceride that is partially hydrogenated distilled monoglyceride (b); preferably the ratio of (a) to (b) is between 4:1 and 1:1; more preferably, between 3:1 and 1:1; most preferably, about 3:1. Most preferably, the peanut butter stabilizer comprises substantially completely hydrogenated cottonseed oil (a) and partially hydrogenated soybean distilled monoglyceride (b).

In another embodiment, the present invention relates to a stabilized peanut butter comprising:
(a) from about 70% to about 99.5% by weight of a material selected from the group consisting of peanuts, peanut oil and combinations thereof; preferably from about 80% to about 99.5%; more preferably from about 90% to about 99.5%; and
(b) from about 0.5% to about 6% by weight of an above-described peanut butter stabilizer; preferably from about 1% to about 4%; more preferably about 2%.

In a preferred embodiment, the above-described stabilized peanut butter additionally comprises from 0% to about 10% by weight salt and from 0% to about 30% by weight sweetener. More preferably the peanut butter stabilizer comprises from about 0.5% to about 4% by weight salt and from about 1% to about 10% by weight sweetener.

In another embodiment, the present invention relates to a stabilized peanut butter comprising:
(a) from about 70% to about 99.5% by weight of a material selected from the group consisting of peanuts, peanut oil and combinations thereof; preferably from about 80% to about 99.5%; more preferably from about 90% to about 99.5%; and
(b) from about 0.5% to about 6% by combined weight of (i) substantially completely hydrogenated edible oil having an IV of less than 10, and (ii) concentrated monoglyceride having an IV between 15 and 70, wherein the ratio of substantially completely hydrogenated edible oil (i) to concentrated monoglyceride (ii) is between 9:1 and 1:9.

In a preferred embodiment, the above-described stabilized peanut butter comprises substantially completely hydrogenated edible oil that is substantially completely hydrogenated vegetable oil (i) and concentrated monoglyceride that is partially hydrogenated distilled monoglyceride (ii); preferably the ratio of (i) to (ii) is between 5:1 and 1:1; more preferably, between 4:1 and 1:1; more preferably, between 3:1 and 1:1; most preferably, about 3:1. Most preferably, the peanut butter comprises substantially completely hydrogenated cottonseed oil (i) and partially hydrogenated soybean distilled monoglyceride (ii).

In another preferred embodiment, the above-described stabilized peanut butter additionally comprises from 0 % to about 10% by weight salt and from 0% to about 30% by weight sweetener. More preferably the peanut butter stabilizer comprises from about 0.5% to about 5% by weight salt and from about 1% to about 10% by weight sweetener.

In another embodiment, the present invention relates to a stabilized peanut butter comprising:
(a) from about 90% to about 99.5% by weight of a material selected from the group consisting of peanuts, peanut oil and combinations thereof; and
(b) from about 1% to about 4% by combined weight of (i) substantially completely hydrogenated edible oil having an IV of less than 8, and (ii) concentrated monoglyceride having an IV between 20 and 60, wherein the ratio of substantially completely hydrogenated edible oil (i) to concentrated monoglyceride (ii) is between 9:1 and 1:9.

In a preferred embodiment, the above-described stabilized peanut butter comprises substantially completely hydrogenated edible oil that is substantially completely hydrogenated vegetable oil (i) and concentrated monoglyceride that is partially hydrogenated distilled monoglyceride (ii); preferably the ratio of (i) to (ii) is between 5:1 and 1:1; more preferably, between 4:1 and 1:1; more preferably, between 3:1 and 1:1; most preferably, about 3:1. Most preferably, the peanut butter comprises substantially completely hydrogenated cottonseed oil (i) and partially hydrogenated soybean distilled monoglyceride (ii).

In another preferred embodiment, the above-described stabilized peanut butter additionally comprises from 0% to about 10% by weight salt and from 0% to about 30% sweetener. More preferably the peanut butter stabilizer comprises from about 0.5% to about 5% by weight salt and from about 1% to about 10% by weight sweetener.

In another embodiment, the present invention relates to a method for manufacturing stabilized peanut butter comprising the steps of:
(a) mixing together ingredients comprising:
   (i) from about 70% to about 99.5% of a material selected from the group consisting of peanuts, peanut oil and combinations thereof; preferably from about 80% to about 99.5%; more preferably from about 90% to about 99.5%; and
   (ii) from about 0.5% to about 6% by combined weight of (A) substantially completely hydrogenated edible oil having an IV of less than 10 and (B) concentrated monoglyceride having an IV between 15 and 70, wherein the ratio of (A) to (B) is between 9:1 and 1:9, by weight, to produce a heated mixture having a temperature sufficiently high to substantially melt the substantially completely hydrogenated edible oil and the concentrated monoglyceride, preferably in excess of 140° F.; and
(b) cooling the heated mixture produced in step (a) to a temperature sufficiently low to produce a dispensable mixture, preferably to a temperature less than 130° F.

In a preferred embodiment, the above-described method further comprises the step of (c) dispensing the product of step (b) into food storage containers. In another preferred embodiment of the above-described method, at step (a) the method for mixing comprises grinding.

In a further preferred embodiment of the above-described method, at step (a), the substantially completely hydrogenated edible oil is substantially completely hydrogenated vegetable oil (A) and the concentrated monoglyceride is partially hydrogenated distilled monoglyceride (B). Preferably the ratio of (A) to (B) is between 5:1 and 1:1; more preferably, between 4:1 and 1:1; more preferably, between 3:1 and 1:1; most preferably, about 3:1.

In another embodiment, the present invention relates to a method for manufacturing stabilized peanut butter comprising the steps of:
(a) mixing together ingredients comprising:
   (i) from about 90% to about 99.5% of a material selected from the group consisting of peanuts, peanut oil and combinations thereof, and
   (ii) from about 1% to about 4%, combined weight, of (A) substantially completely hydrogenated edible oil having an IV of less than 8 and (B) concentrated monoglyceride having an IV between 20 and 60, wherein the ratio of (A) to (B) is between 9:1 and 1:9, by weight, to produce a heated mixture having a temperature sufficiently high to substantially melt the substantially completely hydrogenated edible oil and the concentrated monoglyceride, preferably in excess of 140° F.; and
(b) cooling the heated mixture produced in step (a) to a temperature sufficiently low to produce a dispensable mixture, preferably to a temperature below 130° F.

In a preferred embodiment, the above-described method further comprises the step of (c) dispensing the product of step (b) into food storage containers. In another preferred embodiment of the above-described method, at step (a) the method for mixing comprises grinding.

In a further preferred embodiment of the above-described method, at step (a), the substantially completely hydrogenated edible oil is substantially completely hydrogenated vegetable oil (A) and the concentrated monoglyceride is partially hydrogenated distilled monoglyceride (B). Preferably the ratio of (A) to (B) is between 5:1 and 1:1; more preferably, between 4:1 and 1:1; more preferably, between 3:1 and 1:1; most preferably, about 3:1.

The substantially completely hydrogenated fat or oil (hardstock) of the stabilizer has an Iodine Value of less than about 10, preferably less than about 8, and most preferably less than about 3. The substantially completely hydrogenated fat or oil is preferably rich in $C_7$ to $C_{26}$ fatty acids. Suitable beta phase tending oils and fats include, for example, canola oil, rape seed oil, peanut oil, soybean oil, corn oil, sunflower seed oil, safflower seed oil, linseed oil, sesame seed oil, olive oil, and lard. Suitable non-beta phase tending oils and fats include, for example, cottonseed oil, palm oil, mustard seed oil, menhaden oil, sardine oil, and herring oil. Preferably the substantially completely hydrogenated fat or oil is substantially completely saturated cottonseed oil, which typically has an Iodine Value of less than about 3 and the form of cottonseed oil flakes.

The concentrated monoglyceride of this invention has an Iodine Value between about 15 and about 70, preferably between 20 and 60. The concentrated monoglyceride may be derived from a variety of sources including, for example, cottonseed oil, palm oil, peanut oil, soybean oil, rapeseed oil, and coconut oil. Preferably, the concentrated monoglyceride is a partially hydrogenated distilled monoglyceride; most preferably, it is partially hydrogenated soybean distilled monoglyceride.

The substantially hydrogenated fat or oil and the concentrated monoglyceride may be added, during the preparation of the peanut butter, as separate ingredients or as a combination.

The peanut butter of this invention comprises from 0% to about 10% by weight salt, salt substitutes, or mixtures thereof; preferably, from about 0.5% to about 5%; most preferably from about 1% to about 3%. Salt substitutes include, for example, potassium chloride.

The peanut butter comprises from 0% to about 30% by weight added sweetener; preferably, from about 1% to about 10%. Suitable sweeteners include, for example, sucrose, dextrose, fructose, honey, molasses, high fructose corn syrup, lactose, maltose and maltose syrup.

Suitable sweeteners also include artificial sweeteners, for example, aspartame, saccharine and cyclamate.

The peanut butter can also optionally comprise from about 0.5% to about 2% by weight emulsifiers. Suitable emulsifiers include, for example, mono- and diglycerides, sucrose mono- and diesters of $C_{14}$ to $C_{22}$ fatty acids and lecithin.

The peanut butter can also optionally comprise flavor enhancers, for example, natural or artificial peanut flavors and caramel flavors. The amount of flavor enhancer added is a matter of taste, but usually is from about 0.1% to about 2% by weight.

The peanut butter is not limited to the standard of identity for peanut butter as described in 21 C.F.R. §164.150 or subsequent regulations. The peanut butter encompasses related products including, but not limited to, peanut spreads containing artificial flavorings, artificial sweeteners, chemical preservatives, or color additives.

The peanut butter of this invention may be incorporated into a variety of edible foods including, for example, peanut butter cracker sandwiches, candies, and baked goods. See, e.g., Woodroof, J. G., "*Peanuts: Production, Processing, Products, Second Edition,*" The AVI Publishing Company, Westport, Connecticut, pp. 190, 226–246 (1973).

The present invention is described in further detail in the following non-limiting examples:

EXAMPLES

Example 1

Peanut Butter Prepared with 50% Distilled Monoglyceride (22 IV): 50% Cottonseed Oil (<3 IV)

1.8 kg of roasted, blanched, cleaned peanuts were ground together with the additional ingredients listed in Table 1 including 2% by weight of a peanut butter stabilizer consisting of 50% partially hydrogenated distilled monoglyceride having an IV of 22 (DMG-40) and 50% substantially completely hydrogenated cottonseed oil having an IV of less than three, in the form of cottonseed oil flakes. During the grinding process the temperature of the mixture exceeds 150° F. which is sufficient to melt and thoroughly mix the stabilizer with the other ingredients, to produce a peanut butter. The peanut butter was chilled to a temperature of 115° F. in a one-gallon ice cream maker and dispensed into 8 ounce jars. The jars of stabilized peanut butter were kept at 45° F. for 24 hours to temper and then stored at room temperature (70–75° F.) for 30 days.

TABLE 1

Standard Peanut Butter Formula

| Ingredient | Weight (kg) | Percent by Weight |
|---|---|---|
| Peanuts | 1.80 | 90.0 |
| Dextrose | 0.135 | 6.75 |
| Stabilizer | 0.040 | 2.00 |
| Salt | 0.025 | 1.25 |

After thirty days the stored peanut butter was visually inspected for the development of free oil on the surface of the peanut butter. In addition, the texture of the peanut butter was measured as the grams force required to penetrate a 45° cone probe 15 mm into the surface of the peanut butter using a TA TX2 texture analyzer. The greater the grams force value the greater or more firm the texture. The results for free oil separation and for texture, as measured by penetration, are shown in Table 2.

For comparative purposes, additional batches of peanut butter were prepared by the same process using the following, alternative, stabilizing compositions:

cottonseed oil (<3 IV);
50% cottonseed oil (<3 IV): 50% rapeseed oil (3 IV);
distilled monoglyceride (3 IV);
distilled monoglyceride (22 IV); and
50% distilled monoglyceride (3 IV): 50% cottonseed oil (<3 IV).

These peanut butters were processed, stored and tested as described above. The results for free oil separation and for texture, as measured by penetration, are shown in Table 2.

Example 2

Peanut Butter Prepared with 50% Distilled Monoglyceride (55 IV): 50% Cottonseed Oil (<3 IV)

1.8 kg of roasted, blanched, cleaned peanuts were ground together with the additional ingredients listed in Table 1 including 2% by weight of a peanut butter stabilizer consisting of 50% partially hydrogenated distilled monoglyceride having an IV of 55 (DMG-70) and 50% substantially completely hydrogenated cottonseed oil having an IV of less than three, in the form of cottonseed oil flakes, to produce a peanut butter. This peanut butter was processed, stored, and tested as in Example 1. The results for free oil separation and for texture, as measured by penetration, are shown in Table 2.

Example 3

Peanut Butter Prepared with 25% Distilled Monoglyceride (22 IV): 75% Cottonseed Oil (<3 IV)

1.8 kg of roasted, blanched, cleaned peanuts were ground together with the additional ingredients listed in Table 1 including 2% by weight of a peanut butter stabilizer consisting of 25% partially hydrogenated distilled monoglyceride having an IV of 22 (DMG40) and 75% substantially hydrogenated cottonseed oil having an IV of less than three, in the form of cottonseed oil flakes, to produce a peanut butter. This peanut butter was processed, stored and tested as in Example 1. The results for free oil separation and for texture, as measured by penetration, are shown in Table 2.

Example 4

Peanut Butter Prepared with 25% Distilled Monoglyceride (55 IV): 75% Cottonseed Oil (<3 IV)

1.8 kg of roasted, blanched, cleaned peanuts were ground together with the additional ingredients listed in Table 1 including 2% by weight of a peanut butter stabilizer consisting of 25% partially hydrogenated distilled monoglyceride having an IV of 55 (DMG-70) and 75% substantially hydrogenated cottonseed oil having an IV of less than three, in the form of cottonseed oil flakes, to produce a peanut butter. This peanut butter was processed, stored, and tested as in Example 1. The results for free oil separation and for texture, as measured by penetration, are shown in Table 2.

TABLE 2

Comparison of peanut butter stabilizers, at a concentration of 2% by total weight in peanut butter, after one month storage.

| Stabilizer: | Texture (grams force): | Free oil separation: |
|---|---|---|
| cottonseed oil (<3 IV) | 425 | None |
| 50% cottonseed oil (<3 IV) 50% rapeseed oil (3 IV) | 300 | None |
| monoglyceride (3 IV) | 161 | Yes |
| monoglyceride (22 IV) | 123 | Yes |
| monoglyceride (55 IV) | 108 | Yes |
| 50% monoglyceride (3 IV) 50% cottonseed oil (<3 IV) | 249 | None |
| 50% monoglyceride (22 IV) 50% cottonseed oil (<3 IV) | 491 | None |
| 50% monoglyceride (55 IV) 50% cottonseed oil (<3 IV) | 456 | None |
| 25% monoglyceride (22 IV) 75% cottonseed oil (<3 IV) | 632 | None |
| 25% monoglyceride (55 IV) 75% cottonseed oil (<3 IV) | 611 | None |

The data in Table 2 demonstrates that the peanut butter of this invention, as described in Examples 1–4, showed no free oil separation after storage for one month.

The data in Table 1 also illustrates that a blend of fully hydrogenated cottonseed oil, with an Iodine Value less than 3, and partially hydrogenated soybean distilled monoglycerides, with Iodine Values of 22 and 55, can impart a stronger texture, at the same concentration in the peanut butter (2%), than fully hydrogenated vegetable oil stabilizers, fully hydrogenated distilled monoglycerides, or combinations of fully hydrogenated vegetable oils and fully hydrogenated monoglycerides. Unexpectedly, stabilizers comprising fully hydrogenated cottonseed oil and partially hydrogenated soybean distilled monoglycerides, with Iodine Values of 22 and 55, impart a firmer texture to the peanut butter than does a stabilizer comprising fully hydrogenated cottonseed oil, with an Iodine Value of less than 3, and fully saturated soybean distilled monoglyceride, with an Iodine Value of 3. Consequently, the stabilizers of this invention, comprising a mixture of fully hydrogenated cottonseed oil and partially hydrogenated soybean distilled monoglycerides, may be used at lower concentrations in peanut butter to achieve equivalent stability than stabilizers consisting of fully hydrogenated cottonseed oil, fully hydrogenated distilled monoglyceride, or a 1:1 mixture of fully hydrogenated cottonseed oil and fully hydrogenated rapeseed oil.

All publications mentioned herein are hereby incorporated in their entirety by reference.

In view of the foregoing description taken with the examples (and accompanying drawing), those skilled in the art will be able to practice the invention in various enablements without departing from the spirit and scope of the invention as defined in the appended claims.

What is claimed is:

1. A peanut butter stabilizer composition comprising:
   (a) a substantially completely hydrogenated edible oil fraction having an IV of less than 10, and
   (b) a concentrated monoglyceride fraction having an IV between 15 and 70,
      wherein the weight ratio of said hydrogenated edible oil fraction (a) to said monoglyceride fraction (b) is between 9:1 and 1:9.
2. The composition of claim 1, wherein said substantially completely hydrogenated edible oil is a substantially completely hydrogenated vegetable oil.
3. The composition of claim 2, wherein said substantially completely hydrogenated vegetable oil is substantially completely hydrogenated cottonseed oil.
4. The composition of claim 1, wherein said concentrated monoglyceride is partially hydrogenated distilled monoglyceride.
5. The composition of claim 4, wherein said partially hydrogenated distilled monoglyceride is partially hydrogenated soybean distilled monoglyceride.
6. The composition of claim 1, wherein the weight ratio of said hydrogenated edible oil fraction to said concentrated monoglyceride fraction is between 5:1 and 1:1.
7. The composition of claim 1, wherein said concentrated monoglyceride fraction has an IV between 20 and 60.
8. The composition of claim 1, wherein:
   (a) said substantially completely hydrogenated edible oil is substantially completely hydrogenated cottonseed oil; and
   (b) said concentrated monoglyceride is partially hydrogenated soybean distilled monoglyceride.
9. The composition of claim 8, wherein:
   (a) said substantially completely hydrogenated cottonseed oil has an IV of less than 8;
   (b) said partially hydrogenated soybean distilled monoglyceride has an IV between 20 and 60; and
   (c) the weight ratio between said substantially completely hydrogenated cottonseed oil (a) and said partially hydrogenated soybean distilled monoglyceride (b) is between 5:1 and 1:1.
10. A stabilized peanut butter comprising from about 1% to about 4% by weight of a peanut butter stabilizer according to claim 1.
11. The peanut butter of claim 10, additionally comprising peanut oil.
12. The peanut butter of claim 10, additionally comprising:
   (c) from about 0.5% to about 5% by weight of an ingredient selected from the group consisting of salt, salt substitutes and mixtures thereof; and
   (d) from about 1% to about 10% by weight sweetener.
13. A stabilized peanut butter comprising from about 1% to about 4% by combined weight of (i) substantially completely hydrogenated edible oil having an IV of less than 10, and (ii) concentrated monoglyceride having an IV between 15 and 70, wherein the ratio of substantially completely hydrogenated edible oil (i) to concentrated monoglyceride (ii) is between 9:1 and 1:9.
14. The peanut butter of claim 13, wherein said substantially completely hydrogenated edible oil is substantially completely hydrogenated vegetable oil.
15. The peanut butter of claim 14, wherein said substantially completely hydrogenated vegetable oil is substantially completely hydrogenated cottonseed oil.
16. The peanut butter of claim 13, wherein said concentrated monoglyceride is partially hydrogenated distilled monoglyceride.
17. The peanut butter of claim 16, wherein said partially hydrogenated distilled monoglyceride is partially hydrogenated soybean distilled monoglyceride.
18. The peanut butter of claim 13, additionally comprising:
   (c) from about 0.5% to about 5% by weight of an ingredient selected from the group consisting of salt, salt substitutes and mixtures thereof; and
   (d) from about 1% to about 10% by weight sweetener.
19. The peanut butter of claim 13, wherein said substantially completely hydrogenated edible oil is substantially completely hydrogenated cottonseed oil, and said concentrated monoglyceride is partially hydrogenated soybean distilled monoglyceride.
20. The peanut butter of claim 19, additionally comprising:
   (c) from about 0.5% to about 5% by weight of an ingredient selected from the group consisting of salt, salt substitutes and mixtures thereof; and
   (d) from about 1% to about 10% by weight sweetener.
21. The peanut butter of claim 13, additionally comprising peanut oil.
22. A stabilized peanut butter comprising from about 1% to about 4% by combined weight of (i) substantially completely hydrogenated edible oil having an IV of less than 8, and (ii) concentrated monoglyceride having an IV between 20 and 60, wherein the ratio of substantially completely hydrogenated edible oil (i) to concentrated monoglyceride (ii) is between 5:1 and 1:1.
23. The peanut butter of claim 22, wherein said substantially completely hydrogenated edible oil is substantially completely hydrogenated vegetable oil.
24. The peanut butter of claim 23, wherein said substantially completely hydrogenated vegetable oil is substantially completely hydrogenated cottonseed oil.

25. The peanut butter of claim 22, wherein said concentrated monoglyceride is partially hydrogenated distilled monoglyceride.

26. The peanut butter of claim 25, wherein said concentrated monoglyceride is partially hydrogenated soybean distilled monoglyceride.

27. The peanut butter of claim 22, additionally comprising:
(c) from about 0.5% to about 5% by weight of an ingredient selected from the group consisting of salt, salt substitutes and mixtures thereof, and
(d) from about 1% to about 10% by weight sweetener.

28. The peanut butter of claim 22, wherein said substantially completely hydrogenated edible oil is substantially completely hydrogenated cottonseed oil, and said concentrated monoglyceride is partially hydrogenated soybean distilled monoglyceride.

29. The peanut butter of claim 28, additionally comprising:
(c) from about 0.5% to about 5% by weight of an ingredient selected from the group consisting of salt, salt substitutes and mixtures thereof, and
(d) from about 1% to about 10% by weight sweetener.

30. The peanut butter of claim 22, additionally comprising peanut oil.

31. A method for manufacturing stabilized peanut butter comprising the steps of:
(a) mixing together ingredients comprising from about 1% to about 4% by combined weight of (A) substantially completely hydrogenated edible oil having an IV of less than 10, and (B) concentrated monoglyceride having an IV between 15 and 70, wherein the ratio of substantially completely hydrogenated edible oil (A) to concentrated monoglyceride (B) is between 9:1 and 1:9, by weight, said mixing generating enough heat to produce a heated mixture having a temperature sufficiently high to substantially melt said substantially completely hydrogenated edible oil and said concentrated monoglyceride; and
(b) cooling the heated mixture produced in step (a) to a temperature sufficiently low to produce a dispensable mixture.

32. The method of claim 31, wherein said substantially completely hydrogenated edible oil is substantially completely hydrogenated vegetable oil.

33. The method of claim 32, wherein said substantially completely hydrogenated vegetable oil is substantially completely hydrogenated cottonseed oil.

34. The method of claim 31, wherein said concentrated monoglyceride is partially hydrogenated distilled monoglyceride.

35. The method of claim 34, wherein said partially hydrogenated distilled monoglyceride is partially hydrogenated soybean distilled monoglyceride.

36. The method of claim 31, wherein at step (a) the temperature of said heated mixture exceeds 140° F.

37. The method of claim 31, wherein at step (b) the temperature of said dispensable mixture is less than 130° F.

38. The method of claim 31, wherein at step (a) said ingredients additionally comprise:
(iii) from about 0.5% to about 5% by weight of a substance selected from the group consisting of salt, salt substitutes and mixtures thereof, and
(iv) from about 1% to about 10% by weight sweetener.

39. The method of claim 31, wherein said substantially completely hydrogenated edible oils is substantially completely hydrogenated cottonseed oil, and said concentrated monoglyceride is partially hydrogenated soybean distilled monoglyceride.

40. The method of claim 39, wherein at step (a) said ingredients additionally comprise:
(iii) from about 0.5% to about 5% by weight of a substance selected from the group consisting of salt, salt substitutes and mixtures thereof, and
(iv) from about 1% to about 10% by weight sweetener.

41. The method of claim 31, wherein at step (a) the method for said mixing comprises grinding.

42. The method of claim 31, further comprising the step (c) of dispensing the product of step (b) into food storage containers.

43. The method of claim 31, wherein at step (a) said ingredients additionally comprise peanut oil.

44. A stabilized peanut butter manufactured by the process comprising the steps of:
(a) mixing together ingredients comprising from about 1% to about 4%, by combined weight, of (A) substantially completely hydrogenated edible oil having an IV of less than 10, and (B) concentrated monoglyceride having an IV between 15 and 70, wherein the ratio of completely hydrogenated edible oil (A) to concentrated monoglyceride (B) is between 9:1 and 1:9, by weight, said mixing generating enough heat to produce a heated mixture having a temperature sufficiently high to substantially melt said substantially completely hydrogenated edible oil and said concentrated monoglyceride; and
(b) cooling the heated mixture produced in step (a) to a temperature sufficiently low to produce a dispensable mixture.

45. The peanut butter of claim 44, wherein said substantially completely hydrogenated edible oil is substantially completely hydrogenated vegetable oil.

46. The peanut butter of claim 45, wherein said substantially completely hydrogenated vegetable oil is substantially completely hydrogenated cottonseed oil.

47. The peanut butter of claim 44, wherein said concentrated monoglyceride is partially hydrogenated distilled monoglyceride.

48. The peanut butter of claim 47, wherein said partially hydrogenated distilled monoglyceride is partially hydrogenated soybean distilled monoglyceride.

49. The peanut butter of claim 44, wherein at step (a) the temperature of said heated mixture exceeds 140° F.

50. The peanut butter of claim 44, wherein at step (b) the temperature of said dispensable mixture is less than 130° F.

51. The peanut butter of claim 44, wherein at step (a) said ingredients additionally comprise:
(iii) from about 0.5% to about 5% by weight of a substance selected from the group consisting of salt, salt substitutes and mixtures thereof, and
(iv) from about 1% to about 10% by weight sweetener.

52. The peanut butter of claim 44, wherein said substantially completely hydrogenated edible oil is substantially completely hydrogenated cottonseed oil, and said concentrated monoglyceride is partially hydrogenated soybean distilled monoglyceride.

53. The peanut butter of claim 52, wherein at step (a) said ingredients additionally comprise:
- (iii) from about 0.5% to about 5% by weight of a substance selected from the group consisting of salt, salt substitutes and mixtures thereof, and
- (iv) from about 1% to about 10% by weight sweetener.

54. The peanut butter of claim 44, wherein at step (a) the method for said mixing comprises grinding.

55. The peanut butter of claim 44, wherein said process further comprises the step (c) of dispensing the product of step (b) into food storage containers.

56. An edible product comprising the peanut butter of any one of claims 10, 13, 22 and 44.

57. The peanut butter of claim 44, wherein at step (a) said ingredients additionally comprise peanut oil.

\* \* \* \* \*